(12) United States Patent
Garikapati et al.

(10) Patent No.: US 8,380,066 B2
(45) Date of Patent: Feb. 19, 2013

(54) NETWORK MANAGEMENT SYSTEM

(75) Inventors: Venkata Ramarao Garikapati, Bangalore (IN); Dharmendra Naik, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 505 days.

(21) Appl. No.: 12/731,275

(22) Filed: Mar. 25, 2010

(65) Prior Publication Data

US 2011/0236022 A1 Sep. 29, 2011

(51) Int. Cl.
*H04J 14/02* (2006.01)

(52) U.S. Cl. ............... 398/79; 398/45; 398/34; 398/48; 398/49; 398/51; 398/54; 398/57; 398/58; 398/33; 398/82; 370/351; 370/225; 370/218; 370/254; 370/392; 370/229; 370/238; 370/401

(58) Field of Classification Search .............. 398/79, 398/45, 46, 47, 48, 49, 50, 51, 53, 54, 55, 398/56, 57, 58, 59, 66, 67, 68, 69, 33, 32, 398/38, 34, 25, 82, 83, 140, 141, 75; 370/351, 370/352, 392, 465, 466, 389, 468, 254, 238, 370/229, 228, 225, 399, 401, 232, 395.31, 370/235, 248, 218, 219, 220, 221

See application file for complete search history.

(56) References Cited

U.S. PATENT DOCUMENTS 7,190,902 B2 * 3/2007 Solheim et al. ............... 398/69
7,664,397 B2 * 2/2010 Yuki et al. ..................... 398/58

* cited by examiner

*Primary Examiner* — Hanh Phan
(74) *Attorney, Agent, or Firm* — David L. Soltz

(57) ABSTRACT

A network including nodes configured to provide auto-discovery and those that do not are provided in a network. The nodes that do not provide auto-discovery may be provided as end points or terminating nodes in the network. A path or circuit identifier is entered into a database at those nodes and communicated to a network management system. The network management system compares the path identifiers, and, if the two match, the network management system designates the nodes associated with the path identifiers as terminating nodes. A path through the network connecting these nodes can then be determined and monitored. In addition, fiber connection information may further be stored at each node and communicated to the network management system, such that links along the path can also be identified by the network management system. Thus, path determination and monitoring in a network including non-auto-discovering nodes can thus be obtained.

20 Claims, 4 Drawing Sheets

NETWORK MANAGEMENT SYSTEM

BACKGROUND

Communication networks are known which include a plurality of nodes, which include an ingress node, one or more intermediate nodes, and an output node. Customer or client data is supplied to the ingress node, and then transferred from one intermediate node to the next until the data is output from the egress node. Conventional network management systems monitor and control the connections between nodes in order to select paths through the network over which the client data may be transmitted.

Conventional nodes in a network may be configured to "auto-discover" other nodes in a network, whereby a first node may transmit a signal, such as an optical signal, which carries identification information to a second node. Based on such identification information, the second node may determine or identify a connection with the first node, as well as the service provided by the first node (e.g., SONET, Ethernet, etc.). Such exchanges of information may occur throughout the network such that each node "knows" the connections and identity of every other node in the network. In addition, such information may be provided to a network management system, which may then use that information to determine a topography of the network, such that a data transmission path through the network can be obtained. Examples of known auto-discovery techniques are described in U.S. Pat. Nos. 6,718,141 and 6,968,131, the contents of which are incorporated herein by reference.

Although auto-discovery is effective in identifying connections in a network, additional components may be required to be provided at each node that transmit and receive node identification information. These additional components may add to the cost of each node, thereby increasing the overall cost of the network.

On the other hand, network nodes that do not provide auto-discovery, although less expensive than nodes that do, may be more difficult to monitor by the network management system. In addition, the network management system may have difficulty identifying a connection to and data path including such nodes.

Accordingly, there is a need to monitor nodes that do not provide auto-discovery and identify the connections to such nodes.

SUMMARY OF THE INVENTION

Consistent with the present disclosure, a method is provided for use with a network. The network has first and second terminating nodes and a plurality of intermediate nodes. A first one of the plurality of intermediate nodes is configured to auto-discover a second one of the intermediate nodes. The first and second terminating nodes lacking said auto-discovery and are not configured to auto-discover the plurality of intermediate nodes. The method includes obtaining a first identifier from the first terminating node, which is configured to receive a first client signal that carries client data. The method also includes a step of obtaining a second identifier from the second terminating node, which is configured to supply a second client signal that carries the client data. Further the method includes determining a path that carries the client data through the network from the first terminating node to the second terminating node via the first one of the plurality of intermediate nodes. The step of determining is based, at least in part, on a match between first and second identifiers.

Consistent with an additional aspect of the present disclosure, a network is provided that comprises first and second terminating nodes, as well as a plurality of intermediate nodes. A first one of the plurality of intermediate nodes is configured to auto-discover a second one of the intermediate nodes. The first and second terminating nodes, however, lack such auto-discovery and are not configured to auto-discover the plurality of intermediate nodes. A first processor circuit is provided in the first terminating node. The first processor circuit is configured to obtain a first identifier, and the first terminating node is configured to receive a first client signal, which carries client data. A second processor circuit is provided in the second terminating node. The second processor circuit is configured to obtain a second identifier, and the second terminating node is configured to supply a second client signal, which carries the client data. In addition, a third processor circuit is provided that determines, based, at least on a match between the first and second identifiers, a path that carries the client data through the network from the first terminating node to the second terminating node via the first one of the plurality of intermediate nodes.

It is to be understood that both the foregoing general description and the following detailed description are exemplary and explanatory only and are not restrictive of the invention, as claimed.

The accompanying drawings, which are incorporated in and constitute a part of this specification, and together with the description, serve to explain the principles of the present disclosure.

DESCRIPTION OF THE EMBODIMENTS

Consistent with an aspect of the present disclosure, nodes configured to provide auto-discovery and those that do not are provided in a network. The nodes that do not provide auto-discovery may be provided as end points or terminating nodes in the network. A path or circuit identifier is entered into a database at those nodes and communicated to a network management system. The network management system compares the path identifiers, and, if the two match, the network management system designates the nodes associated with the path identifiers as terminating nodes. A path through the network connecting these nodes can then be determined and monitored. In addition, fiber connection information may further be stored at each node and communicated to the network management system, such that links along the path can also be identified by the network management system. Thus, path determination and monitoring in a network including non-auto-discovering nodes can thus be obtained.

Reference will now be made in detail to the present exemplary embodiments, examples of which are illustrated in the accompanying drawings. Wherever possible, the same reference numbers will be used throughout the drawings to refer to the same or like parts.

Figure 1:
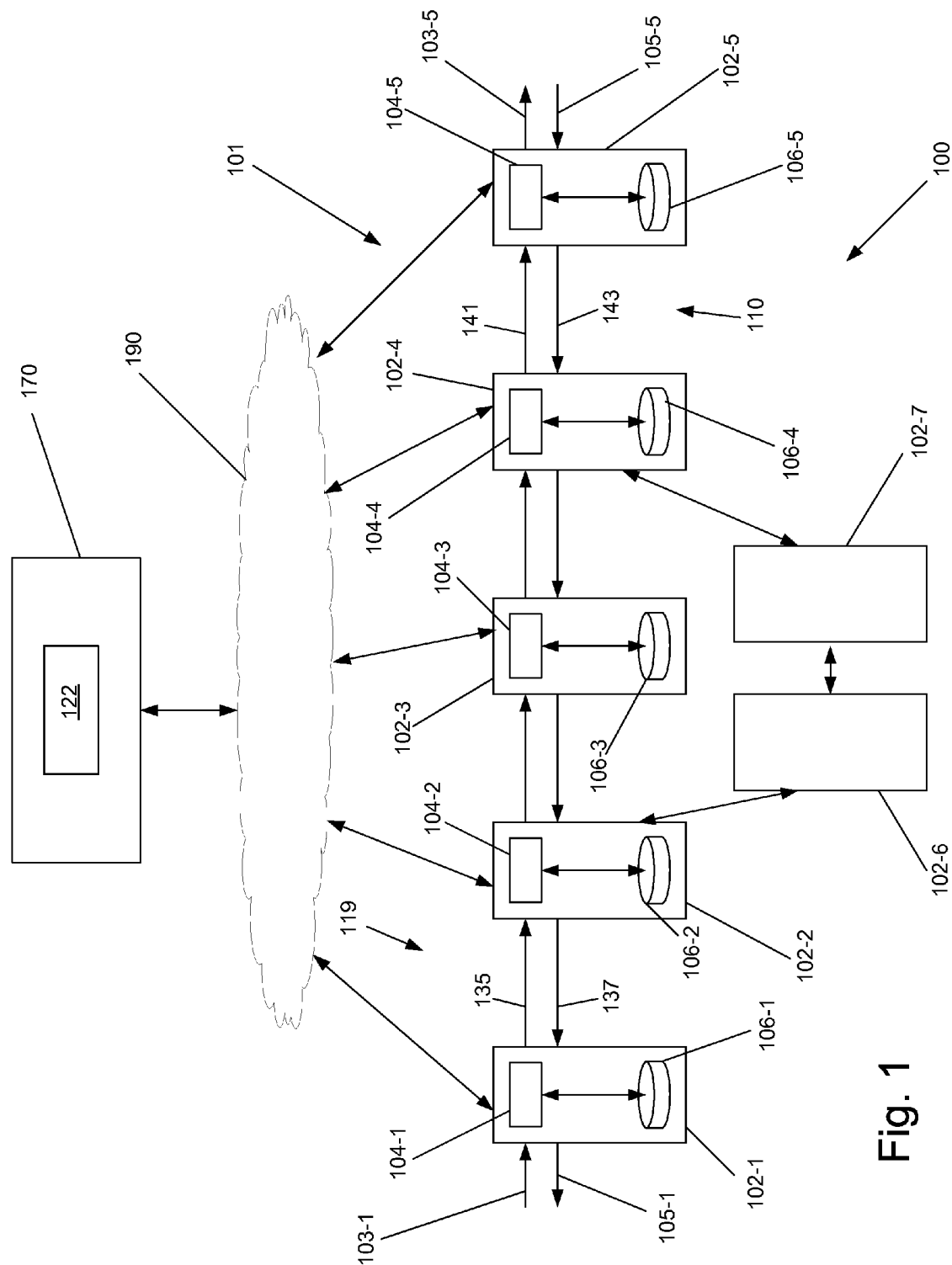
FIG. 1 illustrates an example of a network consistent with the present disclosure.

FIG. 1 illustrates a network 100 consistent with an aspect of the present disclosure. Network 100 includes a plurality of nodes 102-1 to 102-7, for example. Nodes 102-1 to 102-5 and the connections between adjacent ones of these nodes constitute a path 101. Nodes 102-1 and 102-5 are terminating nodes or end points of path 101. Node 102-1, for example, is configured to receive a client signal represented by arrow 103-1, which may carry client data. The client data is output from node 102-1, and may be carried by an optical signal transmitted on optical fiber 135, for example. Intermediate node 102-2 may pass the client data to intermediate node 102-3, which, in turn, passes the client data to node 102-4. From node 102-4, the client data may be forwarded to terminating node 102-5 on an optical signal transmitted on fiber 141. At terminating node 102-5, the client data is output on a client signal represented by arrow 103-5. It is noted that additional optical signals may be transmitted between adjacent ones of nodes 102-2 to 102-4 in transmitting client data from terminating node 102-1 to terminating node 102-5. Fibers 135 and 141 may constitute first (109) and second (110) links of path 101.

In a similar fashion, client signal 105-5 may supply additional client data to node 102-5, and such data may be transmitted via intermediate nodes 102-4 to 102-2 to terminating node 102-1. In particular, optical fiber 143 may supply the client data to node 102-4 near terminating node 102-5 and optical fiber 137 may supply the client data to terminating node 102-1 from node 102-2.

As further shown in FIG. 1, network 100 may include additional nodes 102-6 and 102-7 which may provide additional paths from nodes 102-2 and 102-4, respectively, for data transmission in network 100.

Each of nodes 102-1 to 102-5 may include a corresponding one of processor circuits 104-1 to 104-5, as well as a corresponding one of memories or data bases 106-1 to 106-5. For ease of illustration, similar processor circuits and data bases are not shown in nodes 102-6 and 102-7. Processor circuits 104-2 to 104-4 may be configured such that intermediate nodes 102-2 to 102-4, respectively, are configured to auto-discover each other in a known manner, whereas processor circuits 104-1 and 104-5 in terminating nodes 102-1 and 102-5, for example, lack auto-discovery. Accordingly, terminating nodes 102-1 and 102-5 are not configured to auto-discover each other or any of intermediate nodes 102-2 to 102-4.

As further shown in FIG. 1, data bases 106-1 to 106-5, for example, may communicate with a corresponding one of processor circuits 104-1 to 104-5, as well as with network 190, which may include a public switch telephone network (PSTN), internet protocol (IP) network, wide area network (WAN), local area network (LAN) or any other known network. A network management system 170 including a processor circuit 122 may be provided and configured to communicate with network 190, such that information stored in data bases 106-1 to 106-5 may be supplied or communicated to processor circuit 122.

Figure 2:
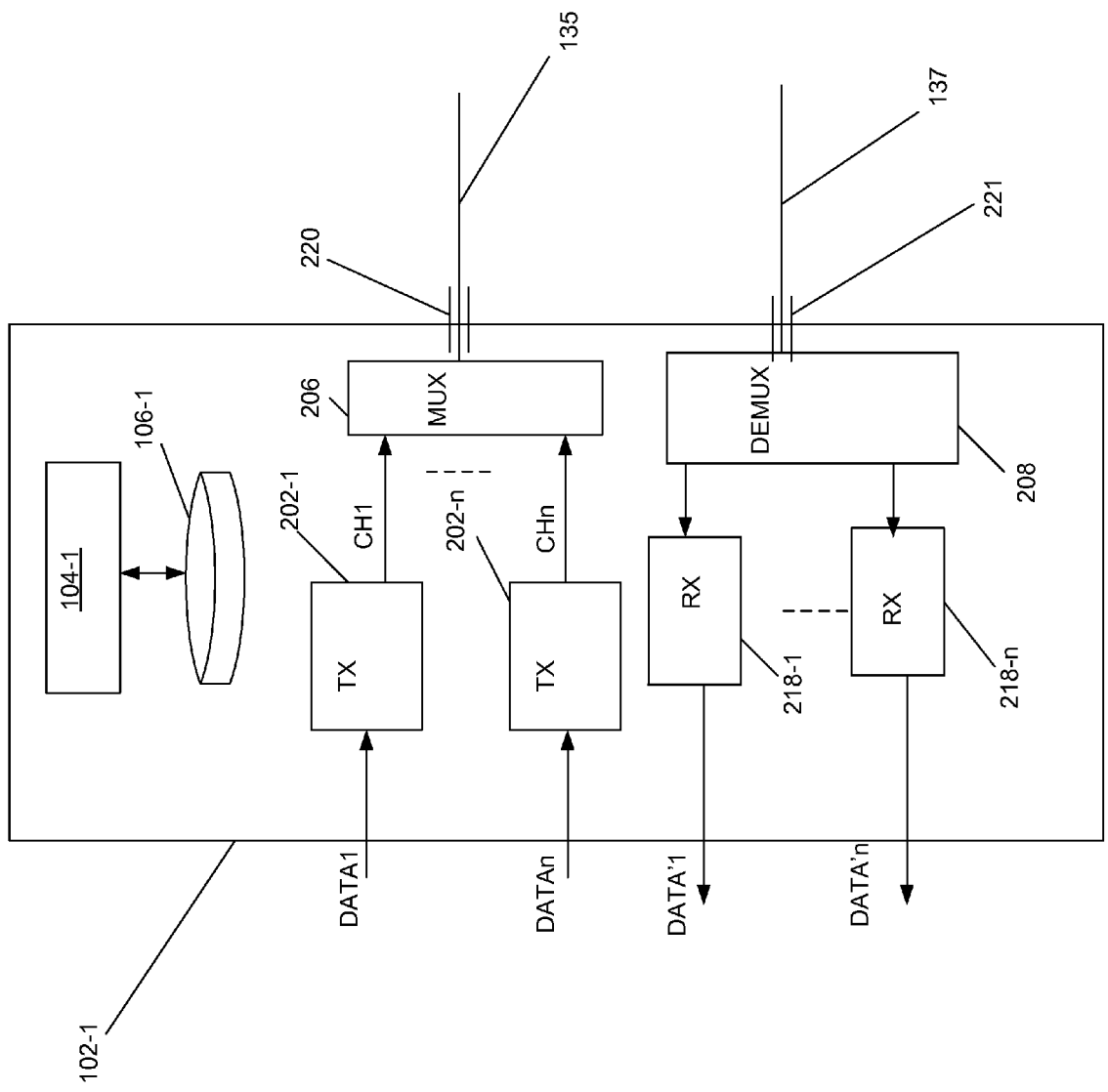
FIG. 2 illustrates an example of a node consistent with the present disclosure.

FIG. 2 illustrates terminating node 102-1 in greater detail. It is understood that terminating node 102-5 may have the same structure as terminating node 102-1. Terminating node 102-1 may include transmitter circuits 202-1 to 202-$n$, each of which receiving a corresponding one of client data signals (each client data signal carrying a corresponding one of client data DATA1 to DATAn). The client data signals may be optical signals, which are converted to corresponding electrical signals within each of transmitter circuits 202-1 to 202-$n$. Such electrical signals may be processed in a known manner whereby the received client data is encoded, among other things, and used to modulate a further optical signal or channel that is output from each transmitter circuit 202-1 to 202-$n$.

Accordingly, as shown in FIG. 2, each optical transmitter supplies a corresponding one of optical channels CH1 to CHn, which are provided to a known optical multiplexer 206. Optical channels CH1 to CHn are combined by optical multiplexer 206 into a wavelength division multiplexed (WDM) optical signal that is output from multiplexer 206 onto fiber 135. Fiber 135 may connect to terminating node 102-1 through port 220.

Node 102-1 may also receive another WDM signal from fiber 137 that is connected to terminating node 102-1 through port 221. A known demulitiplexer 208 may be coupled to fiber 137 to demultiplex the incoming WDM signal and supply a corresponding one of optical signals or channels CH1 to CHn that constitute the WDM signal to each of receiver circuits 218-1 to 218-$n$. Receiver circuits 218-1 to 218-$n$ include known circuit components that convert the received optical channel into a corresponding electrical signal, which is subject to known processing, e.g., decoding, demodulation, and retiming, such that additional client data is output on corresponding client signals DATA'1 to DATA'n. Client signals DATA'1 to DATA'n may be optical signals, for example.

As noted above, it is understood that terminating node 102-5 may have the same or similar structure as node 102-1 and include the transmitter, multiplexer, demultiplexer, and receiver circuits, as well as fiber connections and ports, as those shown in FIG. 2. Accordingly, terminating node 102-5 preferably operates in a similar fashion to receive a WDM signal carrying client data output from terminating node 102-1, and output such data on one or more client signals.

In addition, terminating node 102-5 may optionally supply a WDM signal in response to client data signals in a manner similar to that described above.

The above-noted client signals supplied to and output from terminating nodes 102-1 and 102-5 may be optical signals.

In one example, client data carried by a client signal DATA1, for example, may be supplied to optical channel CH1 output from transmitter circuit 202-1. In another example, however, additional circuitry may be provided so that such client data may be distributed among one or more additional transmitters 202-1 to 202-$n$ and supplied to one or more corresponding additional channels CH2 to CHn.

Typically, nodes 102-2 to 102-4, 102-6, and 102-7 may include, for example, transmitters, receivers, multiplexer, demultiplexers, ports and optical fiber connections similar to or the same as those discussed above. In addition, such nodes may transmit and receive WDM signals in a manner similar to that discussed above.

Figure 3:
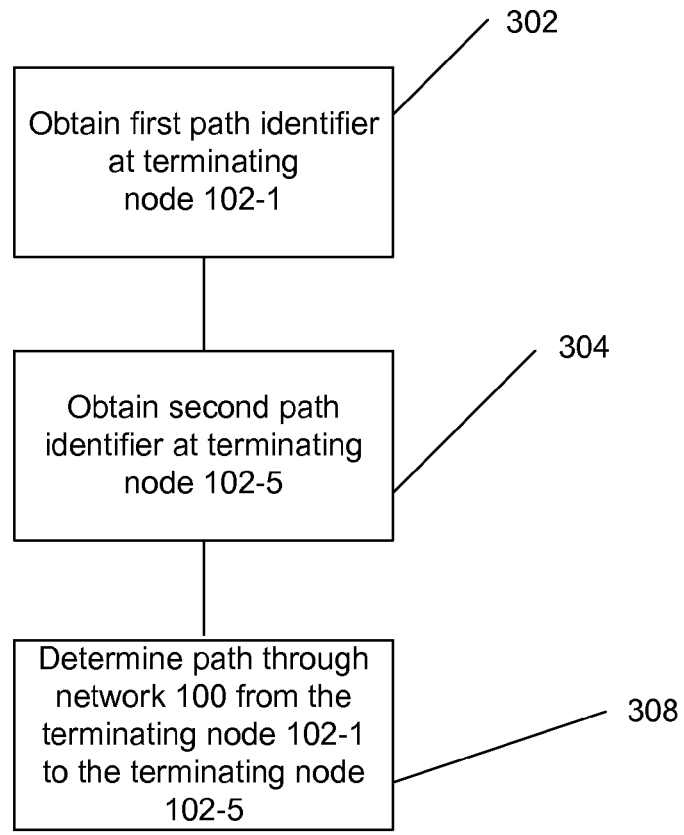
FIG. 3 illustrates an example of a flowchart of a method consistent with the present disclosure.

The operation of network 100 will next be described with reference to FIG. 3, which shows flowchart 300 of a method consistent with the present disclosure.

As noted above in connection with the example shown in FIG. 1, terminating nodes 102-1 and 102-5 may lack auto-discovery. Accordingly, various identifying information associated with terminating nodes 102-1 and 102-5 may be manually entered at these nodes in a known manner, and then obtained and stored in corresponding data bases 106-1 and 106-5 under control of processor circuits 104-1 and 104-5, respectively. In one example, a user may enter a first path identifier at terminating node 102-1. The first path identifier may then be stored in data base 106-1 under control of processor circuit 104-1 (step 302). In a similar fashion, processor circuit 104-5 may obtain a manually entered second path identifier at terminating node 102-5 (step 304).

Data bases 106-1 and 106-5, as well as network management system 170, communicate with or are coupled to network 190. Accordingly, the contents of data bases 106-1 and 106-5 may supply the port and path identifiers, as well as other information stored therein, to network 190, which, in turn, may supply such data or information to network management system 170.

As further noted above, intermediate nodes 102-2, 102-3 and 102-4, 102-6, and 102-7, are configured for auto-discovery, and, as such, may auto-discover node identification information or other information from other nodes in network 100 in a known manner. Such auto-discovered information, including connection information, may be stored in data bases 106-2 to 106-4 (as well as data bases in nodes 102-6 and 102-7), for example, and forwarded to network management system 170 (including processor circuit 122) via network 190 in a manner similar to that described above in connection with data bases 106-1 and 106-5.

Based on the above-described information from data bases 106-1 to 106-5, processor circuit 122 may determine an optimal path, e.g., path 101, along which customer data may be transmitted through network 100 from terminating node 102-1 to 102-5 (step 308). In one example, processor circuit 122 may identify a match between path identifiers supplied from nodes 104-1 and 104-5 and thus determine that both nodes are terminating nodes of a particular path through network 100. Processor circuit 122 may then determine, based on the path identifier, the client data transmission path, e.g., path 101, through network 100.

Figure 4:
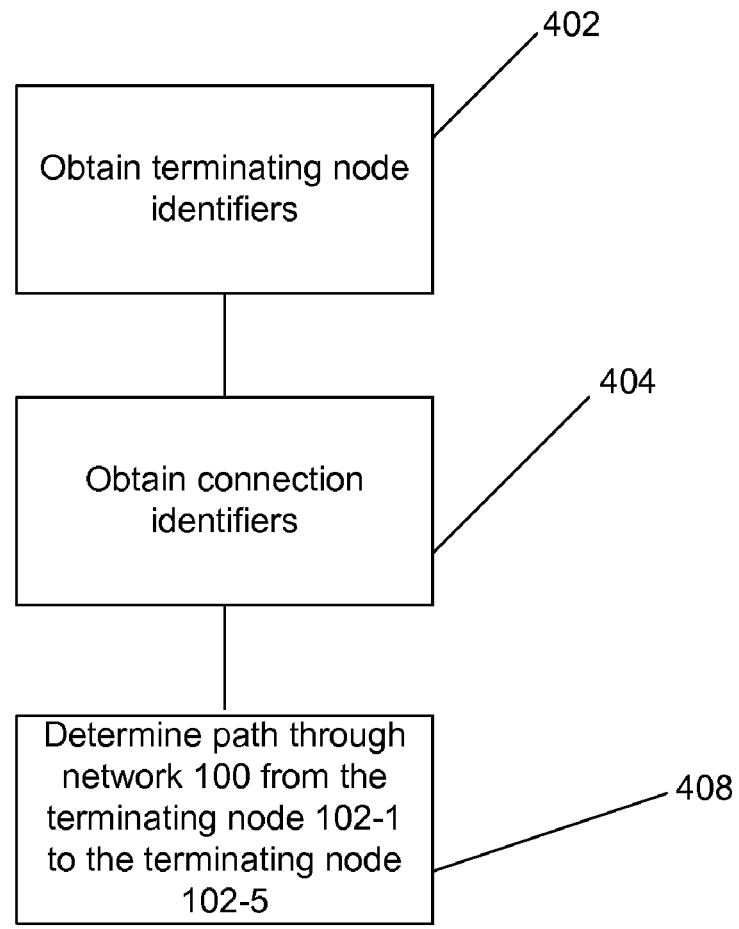
FIG. 4 illustrates an example of a flowchart of an alternative method consistent with the present disclosure.

In addition to the circuit or path identifiers which are obtained and stored in data bases 106-1 and 106-5 at terminating nodes 102-1 and 102-5, respectively, other information associated with these nodes may be stored in data bases 106-1 and 106-5. For example, connection identifiers, such as information identifying fibers and the ports connected thereto ("port identifiers") may be manually entered at each terminating node 102-1 and 102-5. Accordingly, consistent with a further aspect of the present disclosure, an alternative method is provided whereby such connection identifiers may be used to determine path 101 through network 100. Flowchart 400 outlines the steps of the alternative method (see FIG. 4).

Namely, in the example discussed above, a user may manually enter terminating node identifiers that identify nodes 102-1 and 102-5 as terminating nodes. In addition, connection identifiers associated with ports 220 and 221 of terminating node 102-1, as well as connections identifiers associated with corresponding ports of terminating node 102-5, may also be manually entered at each terminating node 102-1 and 102-5. The terminating node and connection identifiers may then be obtained by corresponding processor circuits 104-1 and 104-5 and stored in data bases 106-1 and 106-5 in a manner similar to that described above (steps 402 and 404).

In addition, further connection identifiers associated with fiber connections between adjacent ones of intermediate nodes 102-2, 102-3, 102-4, 102-6, and 102-7 may also be obtained, albeit through auto-discovery, and stored in corresponding data bases, such as data bases 106-2, 106-3, 106-4. In a manner similar to that discussed above, data bases 106-2, 106-3, 106-4 (as well as the data bases in nodes 102-6 and 102-7) provide the terminating node and connection identifiers to processor circuit 122 in network management system 170, and based on such information, processor circuit 122 may determine path 101 through network 100 (step 408).

Processor circuits 104-1 to 104-5 and 122 may include known computers, microprocessors or other logic, as well as software (provided in an appropriate medium) to process the information discussed above (e.g., path and port identifiers), as well as control and monitor the status of each node in network 100. In addition, data bases 106-1 to 106-5 may include any known data base, or memory, such as a random access memory, a read only memory, other known storage device.

Thus, nodes that do, as well as those that do not auto-discover other nodes, may be provided in a network, and both types of nodes may be identified, such that a customer data path including such nodes can be determined. Since non-auto-discovering nodes can be included in the network, the cost of the network can be reduced.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for use with a network having first and second terminating nodes and a plurality of intermediate nodes, a first one of the plurality of intermediate nodes being configured to auto-discover a second one of the intermediate nodes, the first and second terminating nodes lacking said auto-discovery and are not configured to auto-discover the plurality of intermediate nodes, the method including:
    obtaining a first identifier from the first terminating node, the first terminating node being configured to receive a first client signal, the first client signal carrying client data;
    obtaining a second identifier from the second terminating node, the second terminating node being configured to supply a second client signal, the second client signal carrying the client data;
    determining a path that carries the client data through the network from the first terminating node to the second terminating node via the first one of the plurality of intermediate nodes, said determining being based, at least in part, on a match between first and second identifiers.

2. A method in accordance with 1, wherein the first terminating node includes a first data base and the second terminating node includes a second data base, the method further including:
    storing the first and second identifiers in the first and second data bases, respectively.

3. A method in accordance with claim 2, wherein a management system communicates with the first and second data bases, the method further including:
    supplying the first and second identifiers to the management system.

4. A method in accordance with claim 3, wherein the network is a first network, said supplying including providing the first and second identifiers to a second network.

5. A method in accordance with claim 4, further including:
    supplying the first and second identifiers from the second network to the management system.

6. A method in accordance with claim 2, further including:
    supplying a wavelength division multiplexed optical signal from the first terminating node to an optical fiber, the wavelength division multiplexed optical signal including a plurality of optical channels, each of which having a corresponding one of a plurality of wavelengths, the client data being carried by one of the plurality of optical channels.

7. A method in accordance with claim 1, further including:
    supplying a wavelength division multiplexed optical signal from the first terminating node to an optical fiber, the wavelength division multiplexed optical signal including a plurality of optical channels, each of which having a corresponding one of a plurality of wavelengths, a first portion of the client data being carried by a first one of the plurality of optical channels and a second portion of the client data being carried by a second one of the plurality of optical channels.

8. A network, comprising:

first and second terminating nodes;

a plurality of intermediate nodes, a first one of the plurality of intermediate nodes being configured to auto-discover a second one of the intermediate nodes, the first and second terminating nodes lacking said auto-discovery and are not configured to auto-discover the plurality of intermediate nodes;

a first processor circuit provided in the first terminating node, the first processor circuit being configured to obtain a first identifier, the first terminating node being configured to receive a first client signal, the first client signal carrying client data;

a second processor circuit provided in the second terminating node, the second processor circuit being configured to obtain a second identifier, the second terminating node being configured to supply a second client signal, the second client signal carrying the client data;

a third processor circuit that determines, based, at least on a match between the first and second identifiers, a path that carries the client data through the network from the first terminating node to the second terminating node via the first one of the plurality of intermediate nodes.

9. A network in accordance with 8, further including:

a first data base provided in the first terminating node that stores the first identifier; and a second data base provided in the second terminating node that stores the second identifier.

10. A network in accordance with claim 9, wherein the third processor circuit communicates with the first and second data bases, such that the first and second identifiers are supplied to the third processor circuit.

11. A network in accordance with claim 10, wherein the network is a first network, the first and second databases are configured to supply the first and second identifiers, respectively, to a second network, the third processor circuit is configured to be coupled to the second network, such that the third processor circuit is configured to receive the first and second identifiers from the second network.

12. A network in accordance with claim 8, wherein a wavelength division multiplexed optical signal is supplied from the first terminating node to the first optical fiber, the wavelength division multiplexed optical signal including a plurality of optical channels, each of which having a corresponding one of a plurality of wavelengths, the client data being carried by one of the plurality of optical channels.

13. A network in accordance with claim 8, wherein a wavelength division multiplexed optical signal is supplied from the first terminating node to the first optical fiber, the wavelength division multiplexed optical signal including a plurality of optical channels, each of which having a corresponding one of a plurality of wavelengths, a first portion of the client data being carried by a first one of the plurality of optical channels and a second portion of the client data being carried by a second one of the plurality of optical channels.

14. A method for use with a network having first and second terminating nodes and a plurality of intermediate nodes, a first one of the plurality of intermediate nodes being configured to auto-discover a second one of the intermediate nodes, the first and second terminating nodes lacking said auto-discovery and are not configured to auto-discover the plurality of intermediate nodes, the method including:

obtaining a first and second terminating node identifiers that identify the first and second terminating nodes, respectively;

obtaining a plurality of connection identifiers associated with a plurality of connections between the first and second terminating nodes, the first terminating node being configured to receive a first client signal, the first client signal carrying client data, and the second terminating node being configured to supply a second client signal, the second client signal carrying the client data; and determining a path that carries the client data through the network from the first terminating node to the second terminating node via the first one of the plurality of intermediate nodes, said determining being based, at least in part, the plurality of connection identifiers and the first and second terminating node identifiers.

15. A method in accordance with claim 14, wherein the connections include optical fibers.

16. A method in accordance with claim 14, wherein the first terminating node includes a first data base and the second terminating node includes a second data base, the method further including:

storing the first and second terminating node identifiers in the first and second data bases, respectively.

17. A method in accordance with claim 16, wherein a management system communicates with the first and second data bases, the method further including:

supplying the first and second identifiers and the plurality of connection identifiers to the management system.

18. A network, comprising:

first and second terminating nodes;

a plurality of intermediate nodes, a first one of the plurality of intermediate nodes being configured to auto-discover a second one of the intermediate nodes, the first and second terminating nodes lacking said auto-discovery and are not configured to auto-discover the plurality of intermediate nodes, a plurality of connections being provided between the first and second terminating nodes;

a first processor circuit provided in the first terminating node, the first processor circuit being configured to obtain a first terminating node identifier that identifies the first terminating node, the first terminating node being configured to receive a first client signal, the first client signal carrying client data;

a second processor circuit provided in the second terminating node, the second processor circuit being configured to obtain a second terminating node identifier that identifies the second terminating node, the second terminating node being configured to supply a second client signal, the second client signal carrying the client data;

a third processor circuit that determines a path that supplies the client data through the network based at least in part on the first and second terminating node identifiers and a plurality of connection identifiers, the plurality of connection identifiers being associated with the plurality of connections.

19. A network in accordance with 18, further including:

a first data base provided in the first terminating node that stores the first terminating node identifier; and a second data base provided in the second terminating node that stores the second terminating node identifier.

20. A network in accordance with claim 19, wherein the third processor circuit communicates with the first and second data bases, such that the first and second identifiers are supplied to the third processor circuit.

* * * * *